United States Patent [19]

Singh

[11] 4,186,316
[45] Jan. 29, 1980

[54] SHAPED ROTOR TEETH FOR STEPPING MOTORS

[75] Inventor: Gurdial Singh, Avon, Conn.

[73] Assignee: The Superior Electric Company, Bristol, Conn.

[21] Appl. No.: 892,638

[22] Filed: Apr. 3, 1978

[51] Int. Cl.² .............................................. H02K 37/00
[52] U.S. Cl. .................................... 310/49 R; 310/261
[58] Field of Search ................... 310/49, 46, 168, 111, 310/261

[56] References Cited

U.S. PATENT DOCUMENTS

| 2,450,404 | 9/1948 | Bohn | 310/111 X |
| 3,054,916 | 9/1962 | Cobb | 310/111 X |
| 3,097,316 | 7/1963 | Barden et al. | 310/49 |
| 3,991,332 | 11/1976 | Kawamura et al. | 310/49 |

Primary Examiner—Donovan F. Duggan
Attorney, Agent, or Firm—Ernest M. Junkins

[57] ABSTRACT

A diametrical cross-sectional peripheral shape of each of the teeth of a rotor of a stepping motor is made to be more acute than the conventional peripheral arcuate shape that corresponds to an arc having a radius that extends from the axis of the rotor.

2 Claims, 3 Drawing Figures

SHAPED ROTOR TEETH FOR STEPPING MOTORS

In the stepping motors of the type having a rotor formed with radially outwardly extending teeth that cooperate with radially inwardly extending teeth of a stator, there is generally a plurality of static step positions at which the rotor is magnetically held by energization of the stator. It is usually required that these static step positions be quite precisely angularly located in a revolution of a rotor. In heretofore known conventional stepping motors, the diametrical cross-sectional peripheral shape of each rotor tooth and each stator tooth had corresponded to an arc having a center that coincides with the rotor axis. While, in some stepping motors such an arcuate tooth peripheral shape has provided the desired preciseness of the static step positions, other motors have not been able to attain sufficiently precise positions. Thus in stepping motors in which the ratio of tooth to air gap is large, where static step positions include non-alignment of rotor and stator teeth and where the rotor diameter is not especially small, imprecise locations of static step positions with a decreased static holding torque may undersirably occur.

It is accordingly an object of the present invention to provide a rotor for a stepping motor in which the diametrical cross-section peripheral shape of each of the teeth of the rotor is caused to have a shape that increases the preciseness of the location of its static step positions.

Another object of the present invention is to achieve the above object with a rotor in which each rotor tooth has a peripheral shape that increases the static holding torque of the motor without degradation of the running torque over similar motors of heretofore conventionally shaped rotor teeth.

A further object of the present invention is to achieve the above objects in a stepping motor without requiring any alterations in the stator of the motor and in an economical manner without any substantial increase in the cost over such heretofore known motors.

In carrying out the present invention, a stepping motor having the usual toothed stator and toothed rotor is provided. However, instead of the diametrical cross-sectional peripheral shape of each of the teeth of the rotor lying on an arch that has a center coinciding with the axis of the rotor, the periphery is shaped to have a more acute or pointed peripheral shape. Though other shapes may be employed, one specific example that has been found satisfactory is a peripheral shape that lies on an arc which has a radius that is essentially one-half the radius of the motor axis. With such a construction, Applicant has found that the static holding torque retaining the rotor at a static step position may be increased on the order of 20-50% over identical motors having the conventional shape, thus increasing the preciseness of each of the static step positions.

In the drawing

Figure 1:
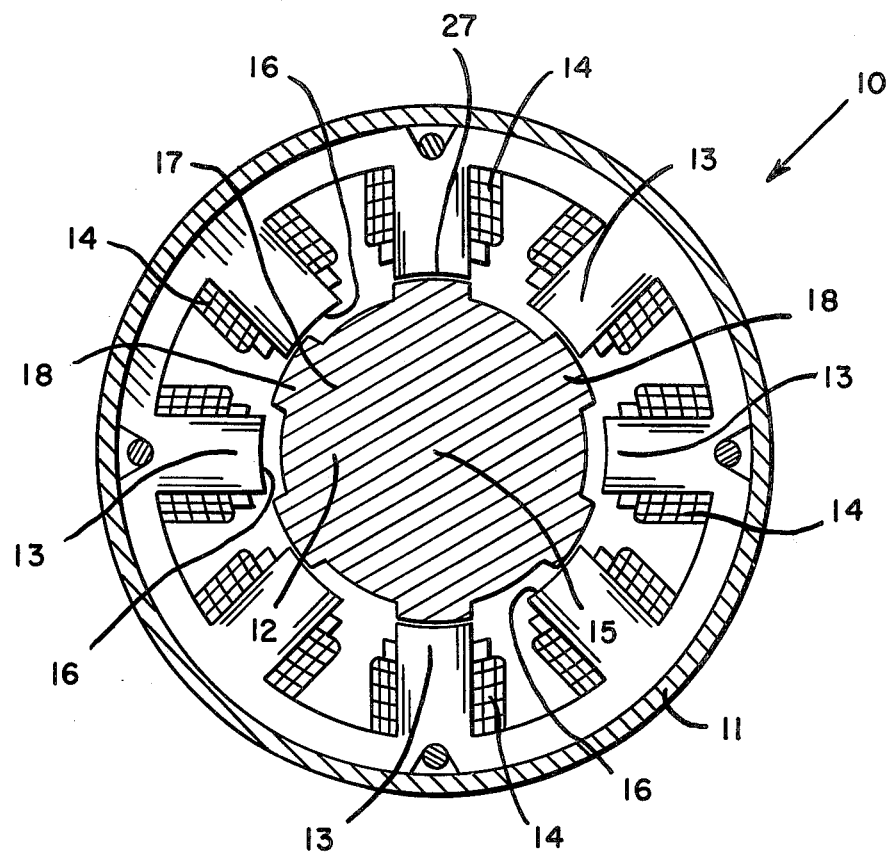
FIG. 1 is a diametrical cross-section of a stepping motor incorporating the present invention.

Referring to the drawing, the present invention of the rotor tooth peripheral shape is shown incorporated into a stepping motor generally indicated by the reference numeral 10 which includes a stator 11 and a rotor 12. The stator is of conventional construction and is thus formed to provide a plurality of inwardly extending poles 13. A coil or winding 14 encircles each pole to provide magnetization of a pole when the winding is energized. As shown, the poles extend inwardly towards axis 15 of the motor 10 with the inner periphery 16 of each stator pole having a diametrical cross-sectional shape that is on an arc formed by a radius that extends from the axis 15.

The rotor 12 is positioned within the stator and has a portion 17 thereof which is shown in cross-section with the portion being formed with radially outwardly extending teeth 18. The teeth 18 are equally angularly positioned about the periphery of the rotor.

In the specific embodiment shown, the stator has eight teeth and the rotor has six teeth so that by different energizations of the coils 14, 24 static step positions may be caused to occur. While the present invention is described as being incorporated into one specific construction of a stepping motor, the invention is not to be considered as being limited thereto, as it is applicable, however, whenever it is desired to enhance the holding torque and preciseness of the static step positions in stepping motors of other and different configurations.

Figure 2:
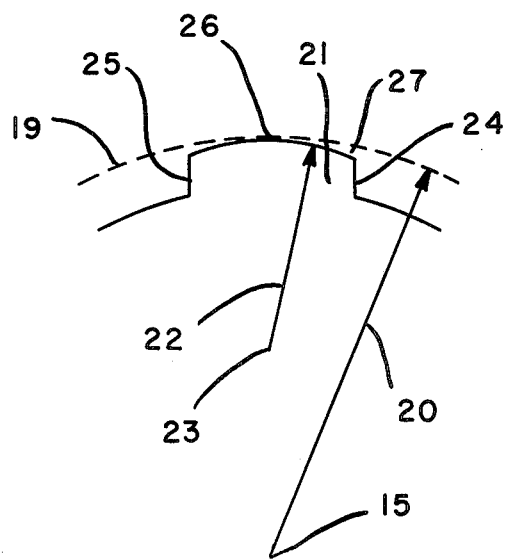
FIG. 2 is an enlarged diagram of a diametrical cross-section of at least one rotor tooth with the other rotor teeth being identical thereto.

In accordance with the present invention, the diametrical cross-sectional periphery of each rotor tooth is shaped to be more acute than the heretofore known conventional shape. As shown in FIG. 2, heretofore known motors had a peripheral shape that lay on a dotted line arc 19 formed by a radius 20 that extends from the axis 15 of the rotor. A peripheral shape utilizing the present invention of each tooth is indicated by the reference numeral 21 and it is an arc formed by a radius 22 which has a center 23 that is just slightly greater than one-half the length of the radius 20. The shape 21 accordingly provides a more acute peripheral shape than the arc 19 so that the ends 24 and 25 of the tooth are located nearer the axis of the rotor than is the midpoint 26 of the shape 21.

It is also noted that a midpoint 26 divides the shape 21 into symetrical portions and that the midpoint 26 also lies on the arc 19 in order that the maximum diameter of the rotor would correspond to a conventionally constructed rotor, thereby providing an air gap 27 that would be identical with that created by a conventional shaped rotor.

Figure 3:
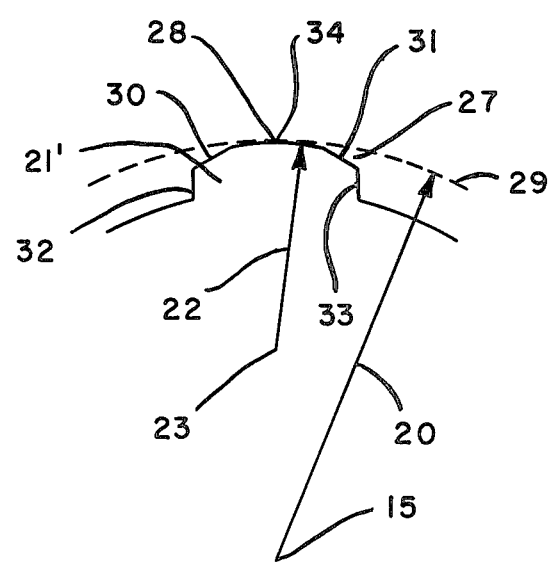
FIG. 3 is a view similar to FIG. 2 of an alternative shape.

It is also contemplated that the present invention may have an alternative shape 21' shown in FIG. 3. This shape has a midportion 28 that lies on a dotted line arc 29 formed by the radius 20 extending from the axis 15 and linear end portions 30 and 31 that extend therefrom to the ends 32 and 33 of the tooth. The relative extent of the linear portions 30 and 31 and the extent of the midportion 28 may vary provided that each tooth should be symetrical about its midpoint 34 with the ends 32 and 33 of the tooth being equidistantly closer to the axis 15 of the rotor than the midpoint 34.

While the drawing only shows diametrical cross-sections of the motor and teeth, it should be noted that as with known stepping motor construction, both the stator and rotor teeth are elongate along the axis of the motor. The complete extent of each rotor tooth is the same the cross-sectional peripheral shape described. Further, in the type of stepping motor in which a permanent magnet is included in the rotor, there is another portion of the rotor similar to the portion 17 with the another portion having a toothed periphery. All teeth on said other portion would also have the same shape as described. Alternatively, in a reluctance type stepping motor, the portion 17 would be the only portion having rotor teeth.

The toothed portion 17 of the rotor may be formed of laminated stampings or of a unitary sintered peice. In these constructions, the punch or the mold respectively, may be formed with the heretofore disclosed tooth peripheral shape thereby obviating any increase in the cost of manufacture as compared to heretofore known shapes.

In the embodiment herein described, the air gap 27 may have a width of 0.003–5 inches while the cross-sectional peripheral length of a rotor tooth may be 0.275 inches. The length to air gap ratio is thus about 70. It has been found that the present invention has particular utility with ratios that are accordingly quite large.

It will accordingly be understood that there has been disclosed a stepping motor capable of being held at a plurality of static step positions. The accuracy of each static step position and the torque holding the rotor at each step position has been increased by forming each of the rotor teeth with a diametrical cross-sectional shape that is more acute than previously known shapes. The shape is symetrical about the midpoint of the tooth with the ends of each tooth being nearer the axis of the rotor than the midpoint. In one embodiment, the shape is an arc determined a radius that is less than the radius extending from the axis of the rotor while in another embodiment, the shape includes linear end portions that extend from a midportion with the midportion lying on an arc having the axis of the rotor as its center.

Variations and midifications may be made within the scope of the claims and portions of the improvements may be used without others.

I claim:

1. In a stepping motor having a stator and a rotor; said stator being formed with a plurality of elongate radially inwardly extending teeth and means for magnetizing the teeth; said rotor having an axis and being formed with a plurality of elongate inwardly extending teeth on a portion of its periphery; said rotor being positioned in said stator to have the teeth of each axially aligned with the rotor being caused to assume a plurality of static step positions in each revolution by the stator teeth magnetizing means; the improvement comprising the periphery of each of the rotor teeth opposite the stator teeth having a more acute diametrical cross-sectional peripheral shape than an arc subtended by a radius having the axis of the rotor as its center, in which each of said teeth has the same identical shape with the shape extending throughout the elongate extent of each tooth, in which the periphery of each tooth is symmetrical about its midpoint, in which the midpoint of periphery of each tooth lies on the arc, in which the ends of the periphery of each tooth are nearer the rotor axis than the midpoint and in which the peripheral shape is an arc having a radius somewhat less than the radius of the arc that extends from the axis.

2. The invention as defined in claim 1 in which the radius of the shape approximates half of the radius of the arc extending from the axis.

* * * * *